United States Patent
Inaba et al.

(10) Patent No.: US 9,891,117 B2
(45) Date of Patent: Feb. 13, 2018

(54) TEMPERATURE SENSOR

(71) Applicant: MITSUBISHI MATERIALS CORPORATION, Tokyo (JP)

(72) Inventors: Hitoshi Inaba, Naka (JP); Noriaki Nagatomo, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 379 days.

(21) Appl. No.: 14/431,687

(22) PCT Filed: Sep. 17, 2013

(86) PCT No.: PCT/JP2013/075959
§ 371 (c)(1),
(2) Date: Mar. 26, 2015

(87) PCT Pub. No.: WO2014/050916
PCT Pub. Date: Apr. 3, 2014

(65) Prior Publication Data
US 2015/0260586 A1    Sep. 17, 2015

(30) Foreign Application Priority Data
Sep. 28, 2012   (JP) ................................. 2012-216186

(51) Int. Cl.
*H01C 7/10*    (2006.01)
*G01K 7/22*    (2006.01)
(Continued)

(52) U.S. Cl.
CPC ............... *G01K 7/223* (2013.01); *G01K 7/22* (2013.01); *H01C 1/142* (2013.01); *H01C 1/148* (2013.01); *H01C 7/041* (2013.01)

(58) Field of Classification Search
CPC ......... H01C 1/142; H01C 1/148; H01C 7/041
(Continued)

(56) References Cited

U.S. PATENT DOCUMENTS

| | | | |
|---|---|---|---|
| 6,342,295 B1 * | 1/2002 | Kobayashi | G01N 27/121 338/35 |
| 2010/0104495 A1 * | 4/2010 | Kawabata | C30B 7/10 423/409 |

(Continued)

FOREIGN PATENT DOCUMENTS

| | | |
|---|---|---|
| JP | U1983-104938 | 7/1983 |
| JP | 2007093453 A | 4/2007 |
| JP | 2012182258 A | 9/2012 |

OTHER PUBLICATIONS

International Search Report for PCT/JP2013/075959 dated Dec. 10, 2013.

*Primary Examiner* — Kyung Lee
(74) *Attorney, Agent, or Firm* — Locke Lord LLP

(57) ABSTRACT

The temperature sensor includes an insulating film; a thin film thermistor portion which is formed on the surface of the insulating film with a thermistor material of TiAlN; the pair of interdigitated electrodes which have a plurality of comb portions and are pattern-formed on the thin film thermistor portion using a metal so as to face each other; and the pair of pattern electrodes which are pattern-formed on the surface of the insulating film and are connected to the pair of interdigitated electrodes, wherein at least a part of each of the pattern electrodes is formed of a conductive resin.

3 Claims, 12 Drawing Sheets

(a)

(b)

(51) Int. Cl.
*H01C 1/142* (2006.01)
*H01C 1/148* (2006.01)
*H01C 7/04* (2006.01)

(58) Field of Classification Search
USPC .................................................... 338/22 R
See application file for complete search history.

(56) References Cited

U.S. PATENT DOCUMENTS

2015/0036723 A1* 2/2015 Fujita ..................... H01C 7/04
374/185
2015/0226616 A1* 8/2015 Nagatomo ............. G01K 13/08
374/185
2015/0362381 A1* 12/2015 Nagatomo ............... G01K 7/22
257/467

* cited by examiner

[Fig.1]
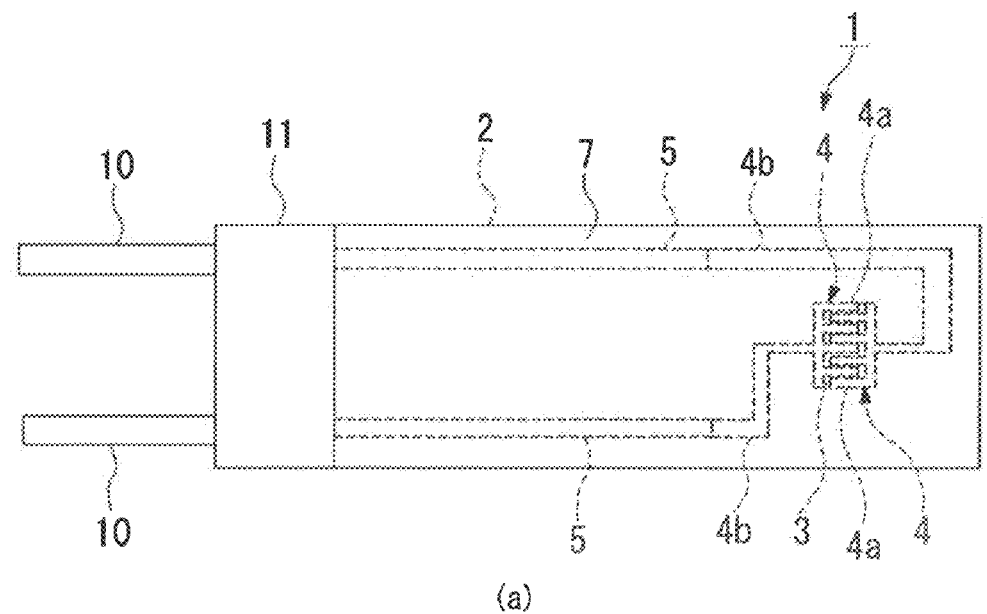
(a)
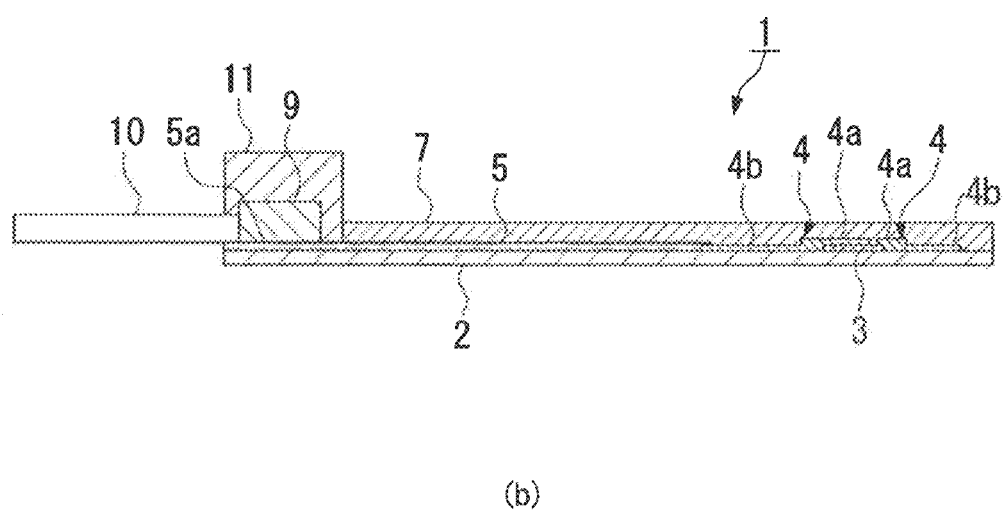
(b)

[Fig.2]
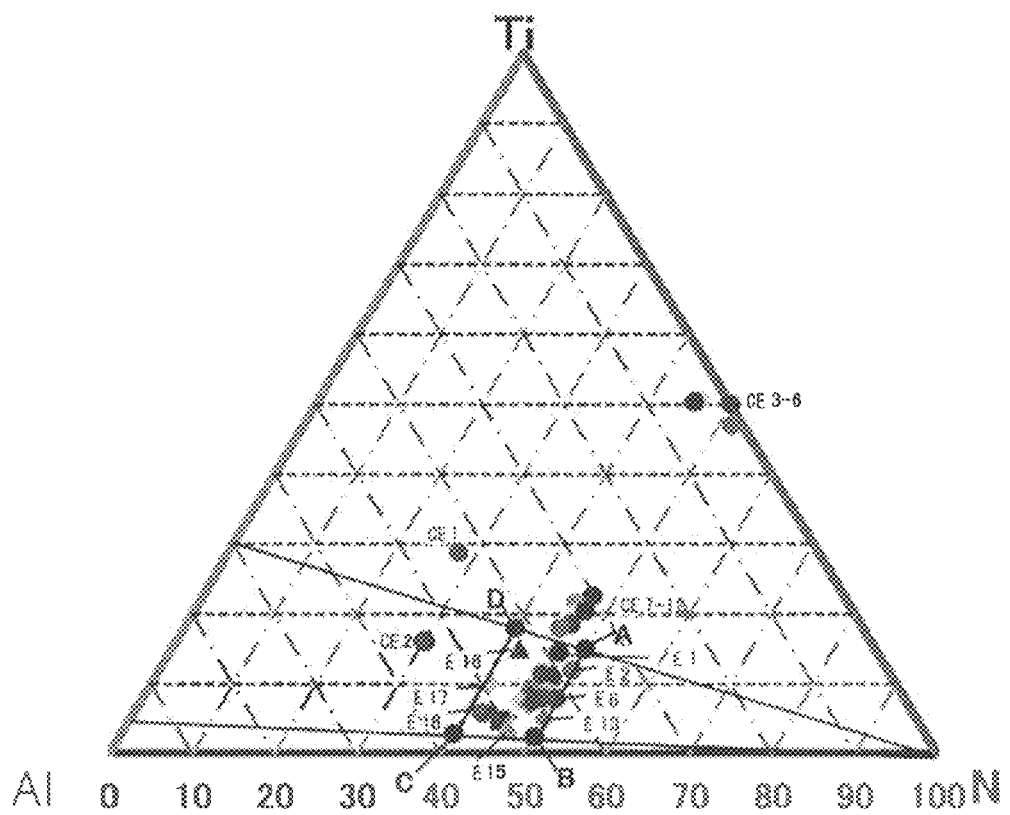

[Fig.3]
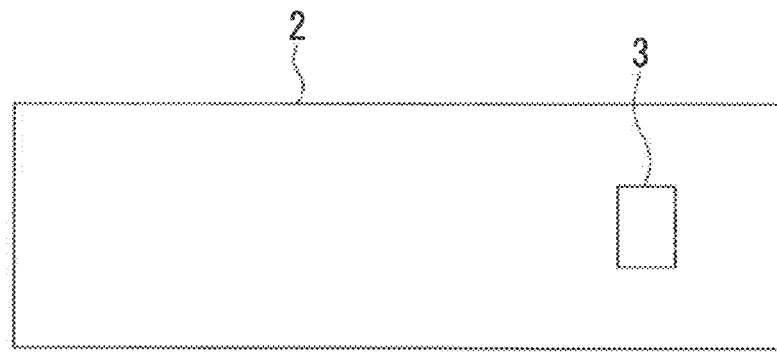
(a)
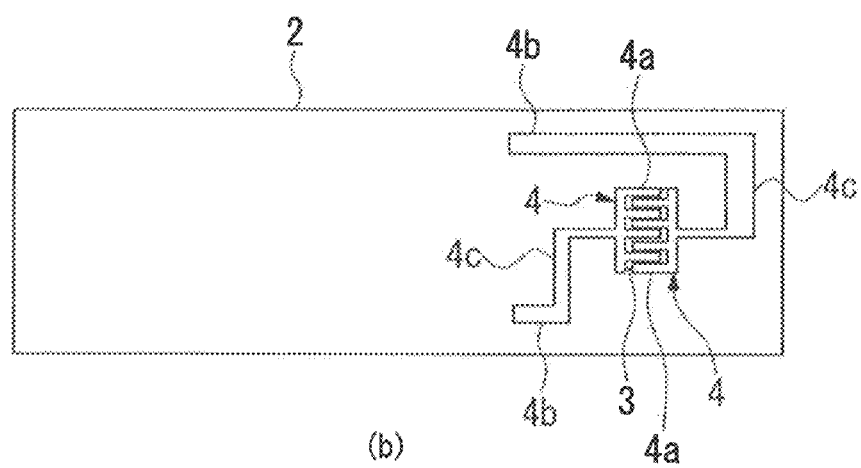
(b)
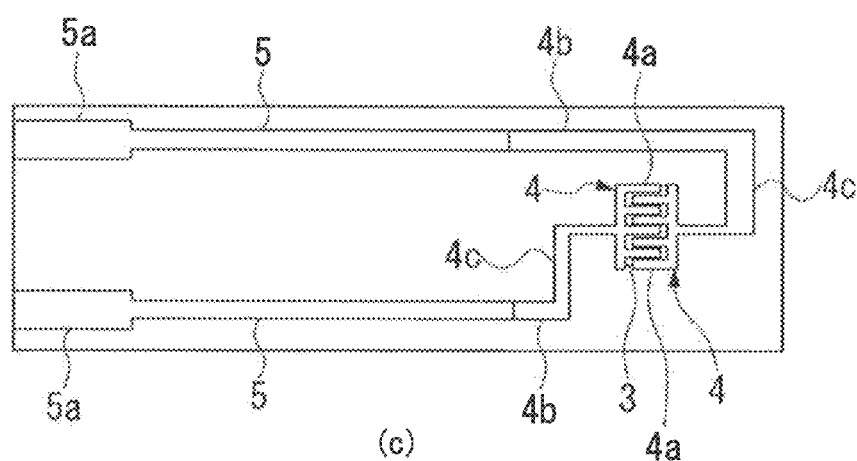
(c)

[Fig.4]
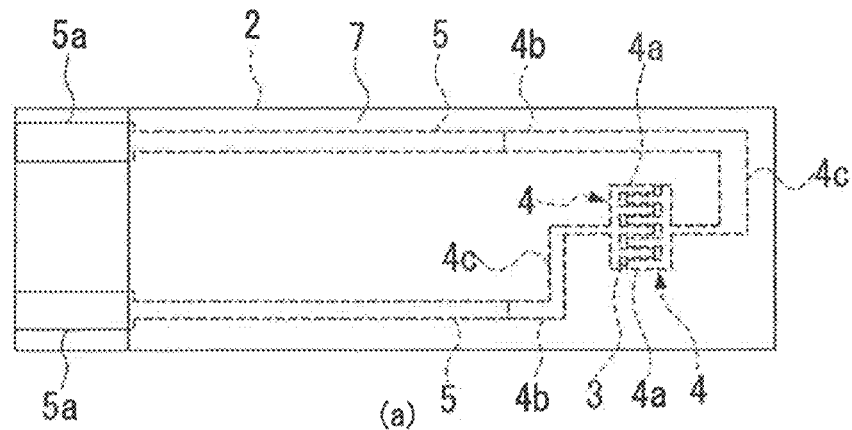
(a)
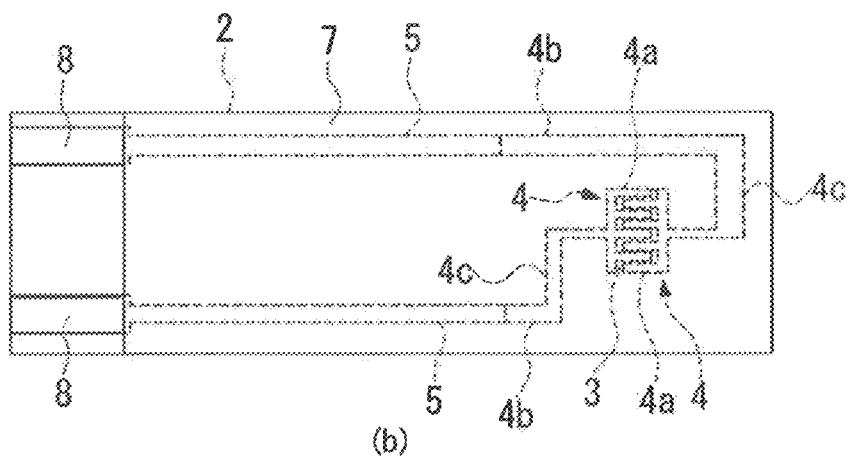
(b)
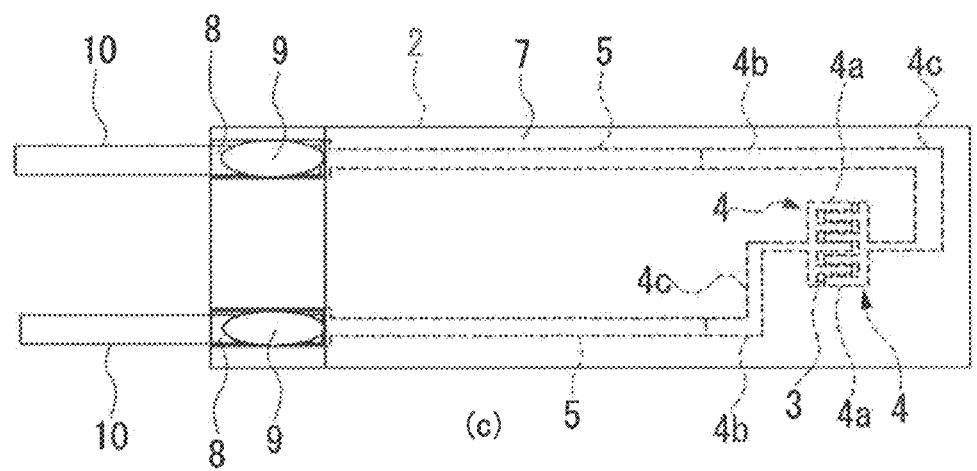
(c)

[Fig.5]
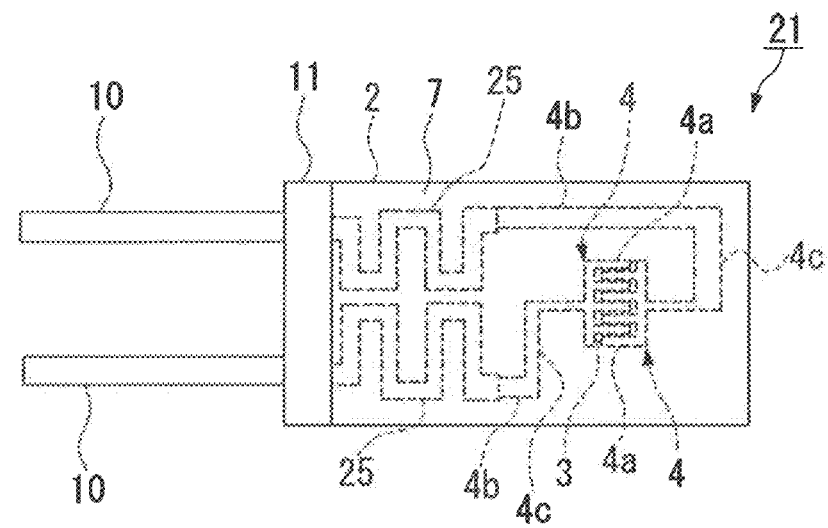
(a)
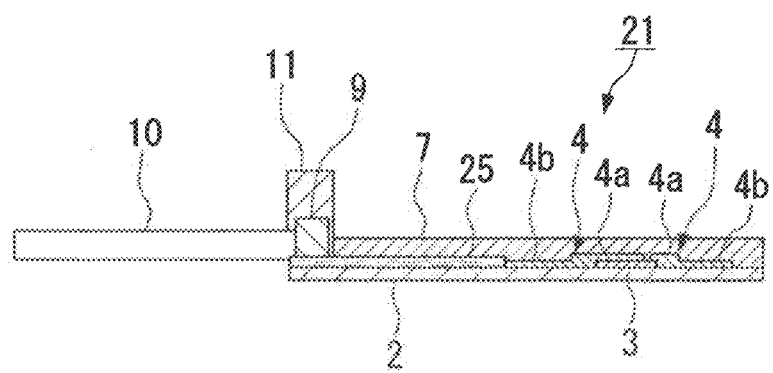
(b)

[Fig.6]
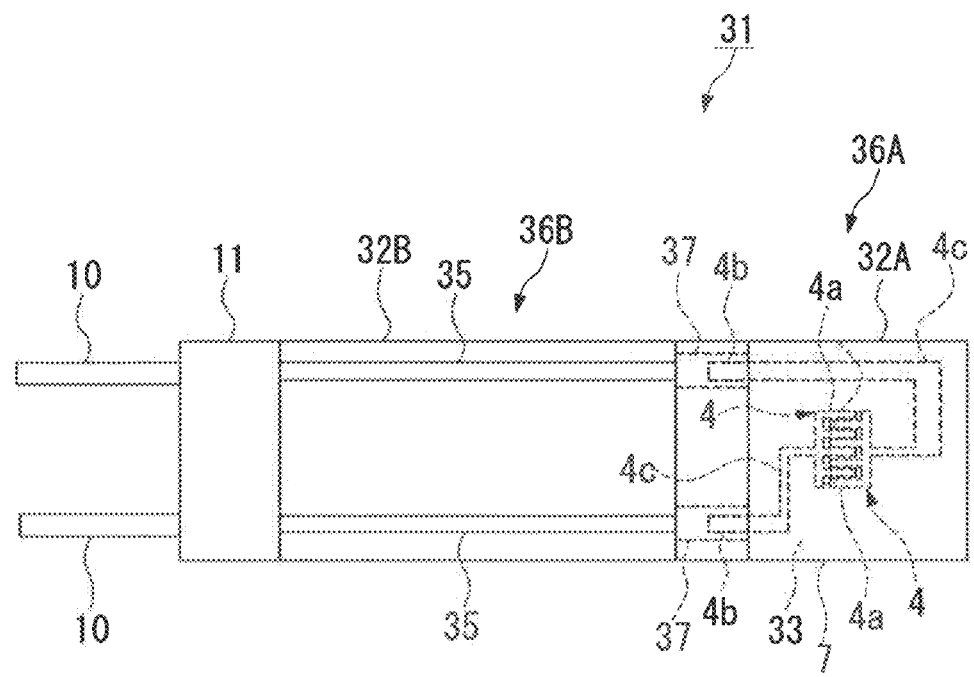
(a)
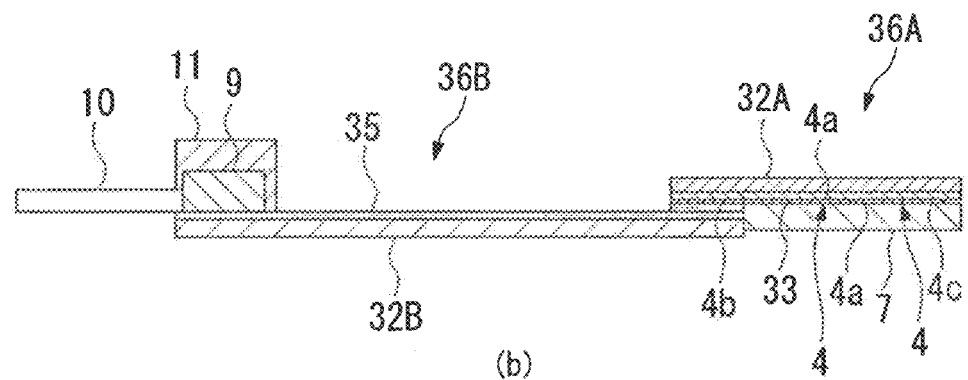
(b)

[Fig.7]
(a) 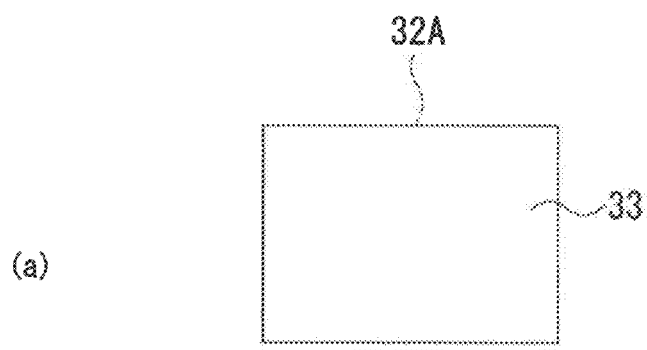
(b) 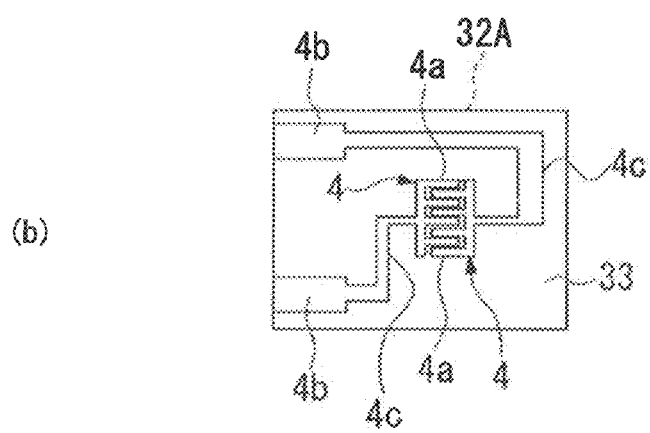
(c) 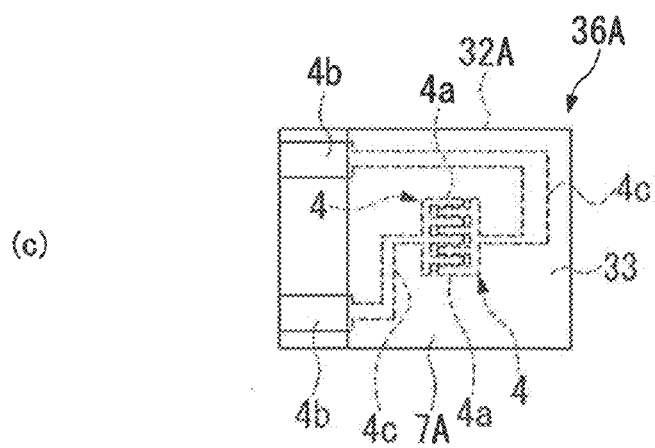

[Fig. 8]
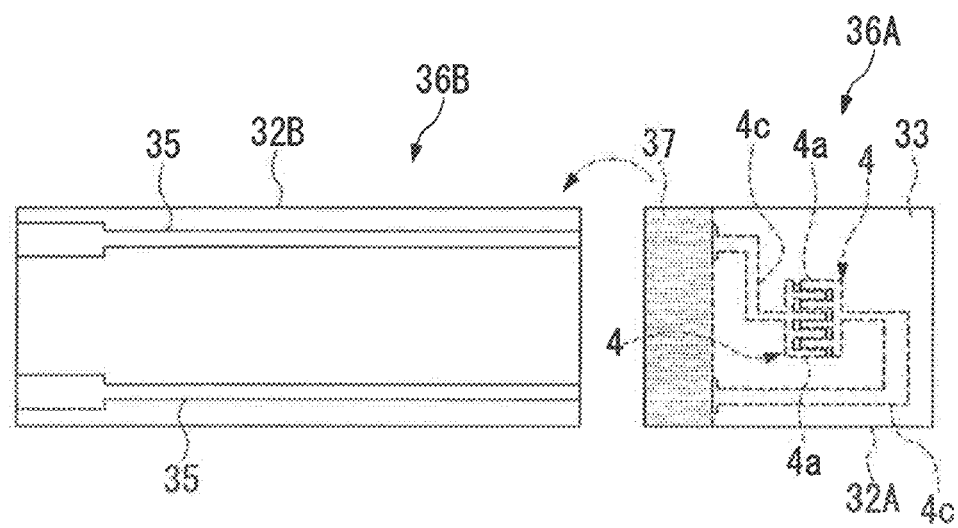
[Fig. 9]
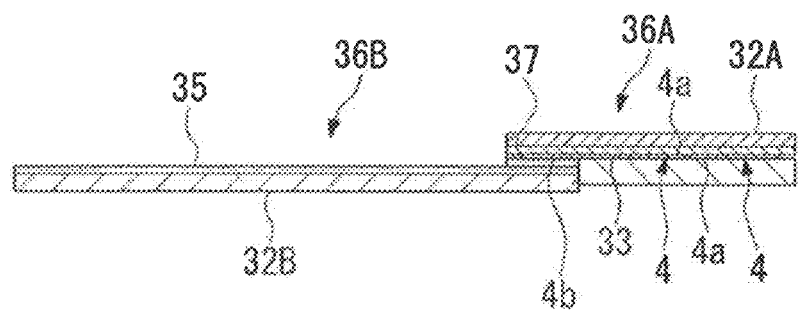

[Fig.10]
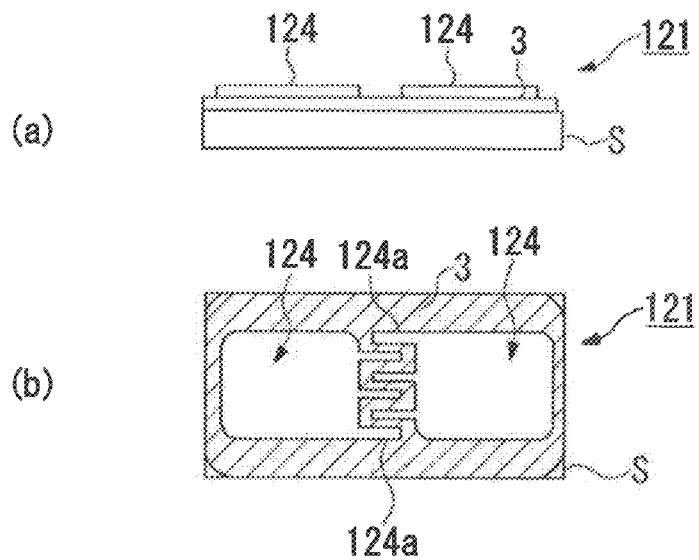
[Fig.11]
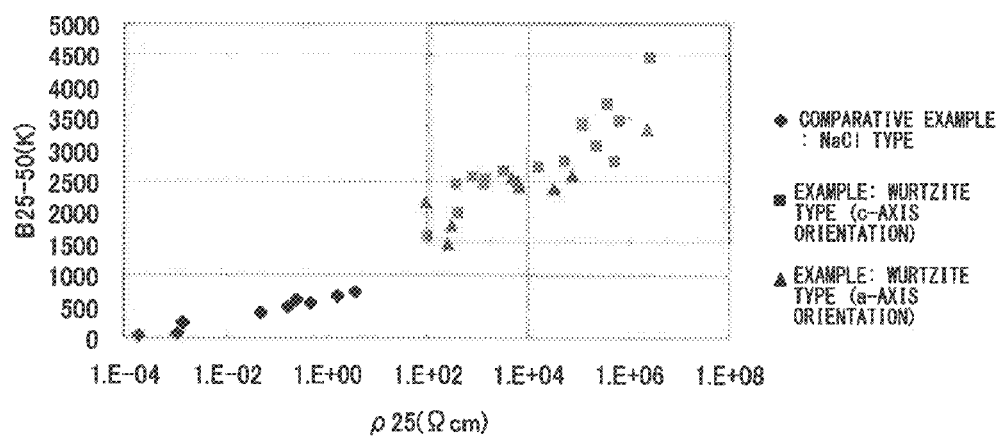

[Fig.12]
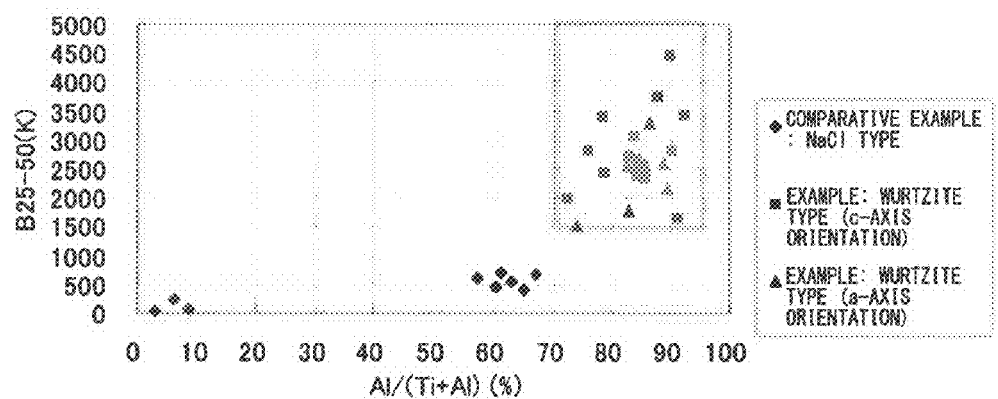
[Fig.13]
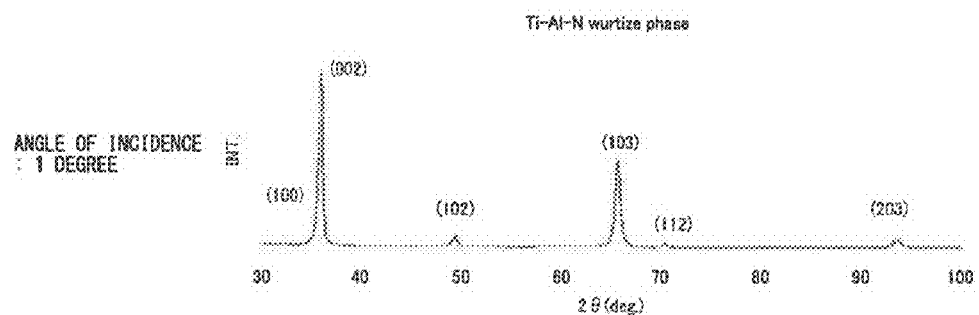
[Fig.14]
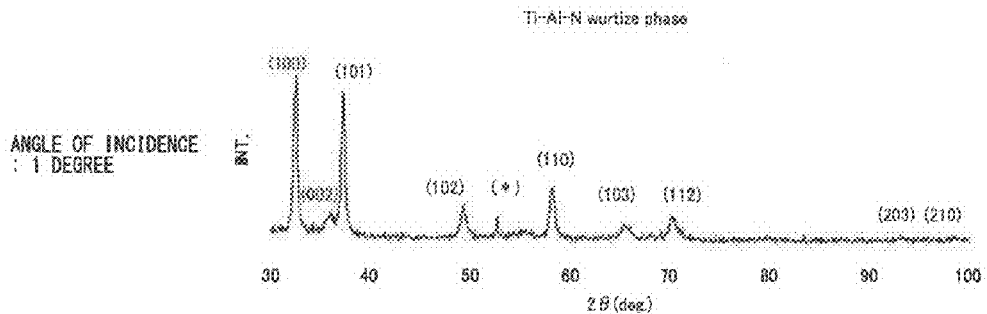

[Fig.15]
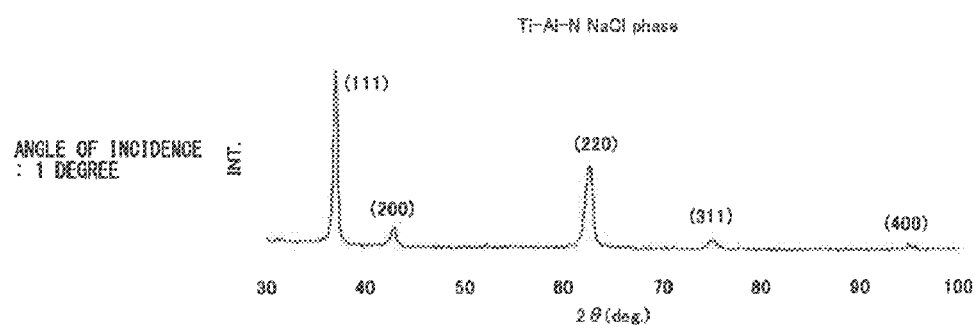
[Fig.16]
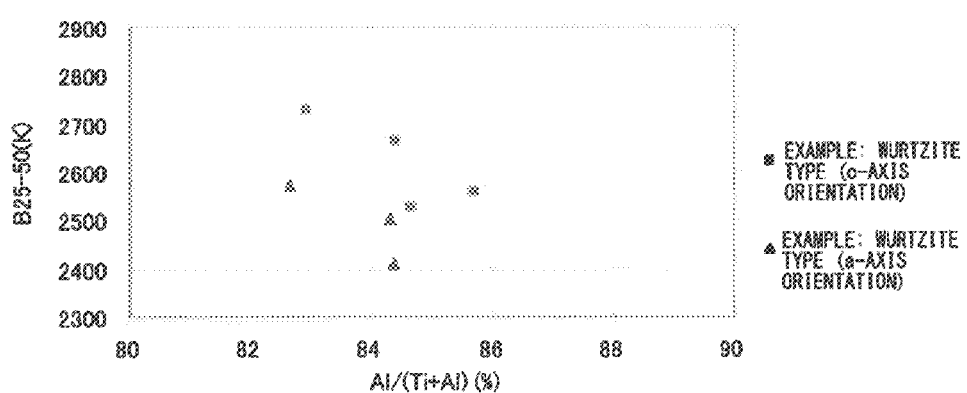

[Fig.17]
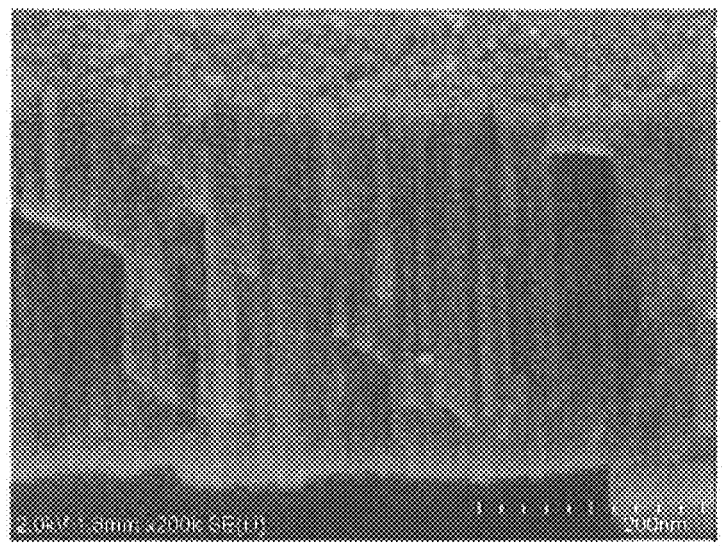
[Fig.18]
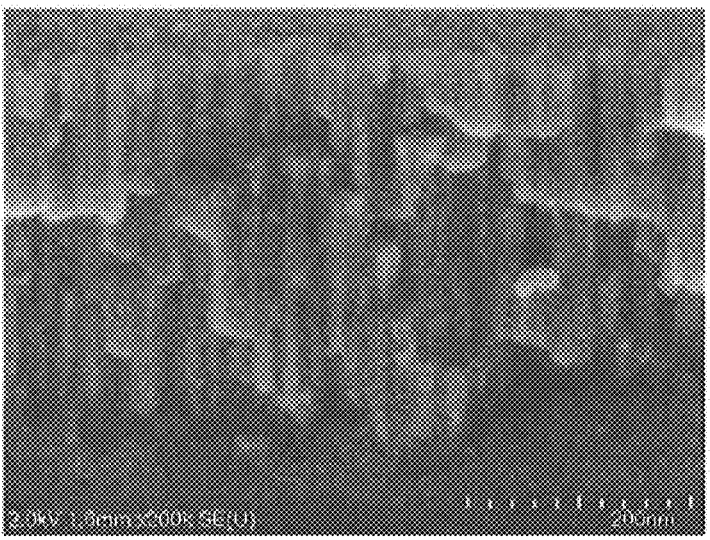

TEMPERATURE SENSOR

CROSS-REFERENCE TO RELATED APPLICATIONS

This application is a U.S. National stage application of PCT International Application No. PCT/JP2013/075959 filed Sep. 17, 2013, which claims the benefit of Japanese Patent Application No. 2012-216186, filed Sep. 28, 2012, the entire contents of the aforementioned applications are hereby incorporated herein by reference.

BACKGROUND OF THE INVENTION

Field of the Invention

The present invention relates to a temperature sensor, i.e., a film-type thermistor temperature sensor which is less influenced by heat conduction from the external wiring.

Description of the Related Art

There has been a requirement for a thermistor material used for a temperature sensor or the like to exhibit a high B constant so as to obtain a high precision and high sensitivity thermistor sensor. Conventionally, transition metal oxides such as Mn, Co, Fe, and the like are typically used as such thermistor materials (see Patent Documents 1 and 2). These thermistor materials need to be fired at a temperature of 600° C. or greater in order to obtain a stable thermistor characteristic.

In addition to thermistor materials consisting of metal oxides as described above, Patent Document 3 discloses a thermistor material consisting of a nitride represented by the general formula: $M_xA_yN_z$ (where N represents at least one of Ta, Nb, Cr, Ti, and Zr, A represents at least one of Al, Si, and B, $0.1 \leq x \leq 0.8$, $0 < y \leq 0.6$, $0.1 \leq z \leq 0.8$, and $x+y+z=1$). In Patent Document 3, only a Ta—Al—N-based material represented by $M_xA_yN_z$ (where $0.5 \leq x \leq 0.8$, $0.1 \leq y \leq 0.5$, $0.2 \leq z \leq 0.7$, and $x+y+z=1$) is described in Example. The Ta—Al—N-based material is produced by sputtering in a nitrogen gas-containing atmosphere using a material containing the elements as set forth as a target. The obtained thin film is subject to a heat treatment at a temperature from 350 to 600° C. as required.

PRIOR ART DOCUMENTS

Patent Documents

[Patent Document 1] Japanese Unexamined Patent Application Publication No. 2003-226573
[Patent Document 2] Japanese Unexamined Patent. Application Publication No. 2006-324520
[Patent Document 3] Japanese Unexamined Patent Application Publication No. 2004-310737
[Patent Document 4] Japanese Unexamined Patent Application Publication No. 2001.116625
[Patent Document 5] Japanese Unexamined Patent Application Publication No, 2010-100735

SUMMARY OF THE INVENTION

Problems to be Solved by the Invention

The following problems still remain in the conventional techniques described above.

In recent years, the development of a film-type thermistor sensor made of a thermistor material on a resin film has been considered, and thus, it has been desired to develop a thermistor material which can be directly deposited on the film. Specifically, it is expected to obtain a flexible thermistor sensor by using the film. Furthermore, although it is desired to develop a very thin thermistor sensor having a thickness of about 0.1 mm, a substrate material using a ceramics material such as alumina has often conventionally used. For example, if the substrate material is thinned, to a thickness of 0.1 mm, the substrate material is very fragile and easily breakable. Thus, it is expected to obtain a very thin thermistor sensor by using the film.

Conventionally, in a temperature sensor formed by a nitride-based thermistor consisting of TiAlN, when a nitride-based thermistor is formed by laminating a thermistor material layer consisting of TiAlN and electrodes on the surface of a film, an electrode layer such as Au is deposited on the thermistor material layer, wherein the electrode layer is patterned into a comb shape having a plurality of comb portions.

Such a film-type thermistor sensor is constituted by a thermistor material layer, a pair of interdigitated electrodes in contact with the thermistor material layer, a pair of extraction electrode portions connected to these interdigitated electrodes, an electrode pad for making connection between these extraction electrode portions and the external wiring, and an over-mold resin for protecting the connection portion from external stresses, all of which are formed on an insulating film. In the film-type thermistor sensor, the electrode pad needs to be distanced away from the thermistor material layer such that the thermistor material layer is not influenced by heat conduction from the external wiring. However, if the temperature of the over-mold resin is higher than that of the thermistor material layer, heat conduction phenomenon occurs through the extraction electrode portions formed of a metal (e.g., Cu: 400 W/m·K, Au: 310 W/m·K) having a large thermal conductivity, which may cause an adverse effect on the temperature precision. Thus, the wiring of the extraction electrode portions needs to be set to be sufficiently long for the thermal insulation, which may cause an increase in the overall size of the film-type thermistor sensor, resulting in difficulty in making it more compact. In particular, since the film-type thermistor sensor is a film-type using the insulating film as a substrate, heat conduction at the film side becomes low as compared with the case where a conductive wiring is formed on other insulating substrates such as alumina, so that the influence of heat conducted from the external wiring via the extraction electrode portions is undesirably relatively large.

On the other hand, if the conventional thermistor material layer consisting of TiAlN is gently bent with a large radius of curvature, cracks are not easily generated in the thermistor material layer, resulting in no change in electric properties such as a resistance value, whereas if the thermistor material layer is severely bent with a small radius of curvature, cracks are easily generated in the thermistor material layer, resulting in a decrease in reliability of electric properties due to a large change in resistance value or the like. In particular, if the film is severely bent with a small radius of curvature in a direction perpendicular to the extending direction of the comb portions, cracks are easily generated near the edge of electrodes due to a difference in stress between the interdigitated electrodes and the thermistor material layer as compared with the case where the film is bent in the extending direction of the comb portions, resulting in an undesirable decrease in reliability of electric properties.

In addition, a film made of a resin material typically has a low heat resistance temperature of 150° C. or lower, and even polyimide which is known as a material relatively having a high heat resistance temperature only has a heat resistance temperature of about 300° C. Hence, when a heat treatment is performed in steps of forming a thermistor material, it has been conventionally difficult to use sec a thermistor material. The above conventional oxide thermistor material needs to be fired at a temperature of 600° C. or higher in order to realize a desired thermistor characteristic, so that a film-type thermistor sensor which is directly deposited on a film cannot be realized. Thus, it has been desired to develop a thermistor material which can be directly deposited on a film without baking. However, even in the thermistor material disclosed in Patent Document 3, there has remained the need to perform a heat treatment for the obtained thin film at a temperature from 350 to 600° C. as required in order to obtain a desired thermistor characteristic. As the thermistor material, although a material having a B constant of about 500 to 3000 K was obtained in Example of a Ta—Al—N-based material, there is no description regarding heat resistance, and thus, the thermal reliability of a nitride-based material has been unknown.

The present invention has been made in view of the aforementioned circumstances, and an object of the present invention is to provide a temperature sensor having a thermistor material layer which can be directly film-formed on a film without requiring firing, which can be less influenced by heat conduction from the external wiring, and which is not susceptible to cracks even in cases where the thermistor material layer is bent.

Means for Solving the Problems

The present invention adopts the following structure in order to solve the aforementioned problems. Specifically, a temperature sensor according to a first aspect of the present invention is characterized in that the temperature sensor includes an insulating film; a thin film thermistor portion which is formed on the surface of the insulating film with a thermistor material of TiAlN; a pair of interdigitated electrodes which have a plurality of comb portions and are pattern-formed on at least one of the top or the bottom of the thin film thermistor portion using a metal so as to face each other; and a pair of pattern electrodes which are pattern-formed on the surface of the insulating film and are connected to the pair of interdigitated electrodes, wherein at least a part of each of the pattern electrodes is formed of a conductive resin.

Specifically, since, in the temperature sensor, at least a part of each of the pattern, electrodes is formed of a conductive resin, heat flowing from the external wiring via the pattern electrodes can be reduced by a conductive resin having a low thermal conductivity as compared with metals, so that sufficient heat insulation can be expected even if the pattern wiring of the extraction electrode portions is not set to be long. In particular, since the insulating film is employed as a substrate, heat conduction at the substrate side becomes low as compared with other insulating substrates, so that the influence of the wiring becomes relatively large. However, such an influence can be suppressed by the presence of a conductive resin having low heat conduction properties. As described above, the interdigitated electrodes with demand for pattern precision are formed of metals by the photolithography technique or the like, and the pattern wiring with demand for heat insulation property rather than pattern precision is formed of a conductive resin, so that high-precision temperature measurement may be achieved. The use of a conductive resin having higher flexibility as compared with metals leads to an improvement in flexibility of the overall temperature sensor.

In general, the thermal conductivity of a conductive resin is about 2 W/m·K which is as low as 1/60 of the thermal conductivity of metals, and thus, the introduction of heat from the terminal portions of the pattern electrodes may also be reduced as ranch as possible so as to achieve thermal insulation.

From the viewpoint of electrical resistance, the electrical resistivity of a conductive resin is about $5 \times 10^{-5}$ Ω·cm. For example, when considering the wiring resistance, the wiring resistance of the two combined segments is about 1Ω based on the assumption that the extraction electrodes have a thickness of 10 μm, an electrode width of 0.5 mm, and an electrode length of 5 mm, which is 1/10000 of 10 kΩ which is often used as the electrical resistance of the thermistor material, resulting in less influence of the wiring resistance. When a conductive resin is used for the platinum temperature measuring resistor as disclosed in Patent Document 4, the platinum temperature measuring resistor 100Ω (Pt 100) is typically often used but cannot be used in this case because about 1% of the wiring resistance value caused by the conductive resin is added, which may deteriorate the precision of the resistance value for the wiring resistance. Furthermore, the film-type thermocouple disclosed in Patent Document 5 cannot measure a thermo-electromotive force with precision if a wiring is formed by a conductive resin. Thus, a conductive resin can be used for the extraction electrodes only if the thermistor material has high resistance.

A temperature sensor according to a second aspect of the present invention is characterized in that each of the pattern electrodes is repeatedly folded back in a meander shape according to the first aspect of the present invention.

Specifically, since, in the temperature sensor, each of the pattern electrodes is repeatedly folded back in a meander shape, the entire size of the temperature sensor can be made compact by substantially reducing the distance between the distal, end and, the proximal end of each of the pattern electrodes, and long pattern electrodes can be ensured in a small space, resulting in obtaining a high heat insulation property.

A temperature sensor according to a third aspect of the present invention is characterized in that the insulating film is comprised of the divisions of a distal film portion on which the thin film thermistor portion and the interdigitated electrodes are formed and a proximal film portion on which the pattern electrodes are formed, and the interdigitated electrodes and a portion of the pattern electrodes that is formed of a conductive resin are connected to each other by a conductive resin and the distal film portion and the proximal film portion are connected to each other by a conductive resin according to the first or second aspect of the present invention.

Specifically, since, in the temperature sensor, the interdigitated electrodes and the pattern electrodes are connected to each other by a conductive resin, and the distal film portion and the proximal film portion are connected to each other by a conductive resin, the pattern electrodes formed of a conductive resin and an anisotropic conductive resin are connected to each other, resulting in obtaining excellent electrical connection and adhesiveness. The distal film portion and the proximal film portion, both of which are formed of a resin, are connected to each other by a conductive resin, resulting in obtaining high adhesiveness. Furthermore, a conductive resin having a high heat insulation property is interposed between the distal film portion and the proximal film portion, so that the influence of heat conducted from the proximal film portion may be reduced. The insulating film is produced by separately producing the distal film portion and the proximal film, portion, so that a, temperature sensor may also be produced with a film portion, being replaced with one having a different shape or the like depending on the size or the installation site of the temperature sensor. Note that it is preferable that an anisotropic conductive adhesive be employed as a conductive resin used for adhesion.

A thermistor sensor according to a, fourth aspect of the present invention is characterized in that the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase according to any one of the first to third aspects of the present invention.

The present inventors' serious endeavor by focusing on an AlN-based material among nitride materials found that, the AlN-based material having a good B constant and exhibiting excellent heat resistance may be obtained without baking by substituting Al-site with a specific metal element for improving electric conductivity and by ordering it into a specific crystal structure because AlN is an insulator and it is difficult for AlN to obtain an optimum thermistor characteristic (B constant: about 1000 to 6000 K).

Thus, the present invention has been obtained on the basis of the above finding Since the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a hexagonal wurtzite-type single phase, the metal nitride material having a good B constant and exhibiting excellent, heat resistance may be obtained without baking.

Note that, when the value "y/(x+y)" (i.e., Al/(Ti+Al)) is less than 0.70, a wurtzite-type single phase is not obtained but two coexist phases of a wurtzite-type phase and a NaCl-type phase or a single phase of only a NaCl-type phase may be obtained, so that a sufficiently high resistance and a high B constant cannot be obtained.

When the ratio of "y/(x+y)" (i.e., Al/(Ti+Al)) exceeds 0.95, the metal nitride material exhibits very high resistivity and extremely high electrical insulation, so that the metal nitride material is not applicable as a thermistor material.

When the ratio of "z" (i.e., N/(Ti+Al+N)) is less than 0.4, the amount of nitrogen contained in the metal is small, so that a wurtzite-type single phase cannot be obtained. Consequently, a sufficiently high resistance and a high B constant cannot be obtained.

Furthermore, when the ratio of "z" (i.e., N/(Ti+Al+N)) exceeds 0.5, a wurtzite-type single phase cannot be obtained. This is because a correct stoichiometric ratio of N/(Ti+Al+N) in a wurtzite-type single phase when there is no defect at nitrogen-site is 0.5.

Effects of the Invention

According to the present invention, the following effects may be provided.

Specifically, since at least a part of each of the pattern electrodes is formed of a conductive resin, according to the temperature sensor of the present invention, sufficient heat insulation can be expected even if the pattern wiring of the extraction electrode portions is not set to be long. In addition, the use of a conductive resin having higher flexibility as compared with metals leads to an improvement in flexibility of the overall temperature sensor.

Furthermore, the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase, the metal nitride material having a good B constant and exhibiting excellent heat resistance may be obtained without baking.

Thus, according to the temperature sensor of the present invention, the influence of heat conducted from the external, wiring can be suppressed, so that high-precision measurement and size reduction can be achieved. By employing the thin film thermistor portion, the thin film thermistor portion is not susceptible to cracks even if it is bent, and is flexible with less surface irregularities, so that the thin film thermistor portion may be installed by being inserted into a gap in the substrate of electronic equipment or a small gap in a contactless power feeding apparatus, a battery, or the like, or may also be installed on a curved surface.

BRIEF DESCRIPTION OF THE DRAWINGS

FIG. 1 is an example of a plan view and a cross-sectional view illustrating a, temperature sensor according to a first embodiment of the present invention.

FIG. 2 is a Ti—Al—N-based ternary phase diagram illustrating the composition range of a metal nitride material for a thermistor according to the first embodiment.

FIG. 3 is a plan view illustrating the sequence of steps up to a pattern, wiring forming step from among the manufacturing processes according to the first embodiment.

FIG. 4 is a plan view illustrating the sequence of steps subsequent to a protective film forming step from among the manufacturing processes according to the first embodiment.

FIG. 5 is an example of a plan view and a, cross-sectional view illustrating a temperature sensor according to a second embodiment of the present invention.

FIG. 6 is an example of a, plan, view and a cross-sectional view illustrating a temperature sensor according to a third embodiment of the present invention.

FIG. 7 is a plan view illustrating the sequence of steps up to a protective film forming step from among the manufacturing processes according to the third embodiment.

FIG. 8 is an explanatory view illustrating an adhering step according to the third embodiment.

FIG. 9 is a cross-sectional view illustrating the state after the adhering step according to the third, embodiment.

FIG. 10 is an example of a front view and a plan view illustrating a film evaluation element for a metal nitride material for a thermistor according to Example of a thermistor sensor of the present invention.

FIG. 11 is a graph illustrating the relationship between a resistivity at 25° C. and a B constant according to Examples and Comparative Example of the present invention.

FIG. 12 is a graph, illustrating the relationship between the Al/(Ti+Al) ratio and the B constant according to Examples and Comparative Example of the present invention.

FIG. 13 is a graph illustrating the result of X-ray diffraction (XRD) in the case of a strong c-axis orientation where Al/(Ti+Al)=0.84 according to Example of the present invention.

FIG. 14 is a, graph illustrating the result of X-ray diffraction (XRD) in the case of a strong a-axis orientation where Al/(Ti+Al)=0.83 according to Example of the present invention.

FIG. 15 is a graph illustrating the result of X-ray diffraction (XRD) in the case where Al/(Ti+Al)=0.60 according to Comparative Example of the present invention.

FIG. 16 is a graph illustrating the relationship between the Al/(Ti+Al) ratio and the B constant obtained by comparing Example revealing a strong a-axis orientation and Example revealing a strong c-axis orientation according to Examples of the present invention.

FIG. 17 is a cross-sectional SEM photograph illustrating Example revealing a strong c-axis orientation according to Example of the present invention.

FIG. 18 is a cross-sectional SEM photograph illustrating Example revealing a strong a-axis orientation according to Example of the present invention,

BEST MODES FOR CARRYING OUT THE INVENTION

Hereinafter, a description will be given of a thermistor sensor according to a first embodiment of the present invention with reference to FIGS. 1 to 4. In a part of the drawings used in the following description, the scale of each component is changed as appropriate so that each component is recognizable or is readily recognized.

A temperature sensor (1) of the present embodiment is a film-type thermistor sensor that includes an insulating film (2); a thin film thermistor portion (3) which is pattern-formed on the surface of the insulating film (2) with a thermistor material of TiAlN; the pair of interdigitated electrodes (4) which have a plurality of comb portions (4*a*) and are pattern-formed on the thin film thermistor portion using a metal so as to face each other; and a pair of pattern electrodes (5) which are pattern-formed on the surface of the insulating film (2) and are connected to the pair of interdigitated electrodes (4) as shown in FIG. 1. Note that each, of FIG. 1(*b*) and other cross-sectional views shows a cross-sectional view taken along the pattern electrodes and the interdigitated electrodes.

At least a part of each of the pattern electrodes (5) is formed of a, conductive resin. In the present embodiment, the pair of pattern electrodes (5) is formed of a conductive resin across the entire length thereof, and is linearly formed extending in parallel along the strip-like insulating film (2).

As the conductive resin, an epoxy resin containing Ag filler, Cu filler, or plated balls, a silicone resin, a urethane resin, an acrylic resin, or the like may be employed.

The temperature sensor (1) of the present embodiment includes a thin film thermistor portion (3) which is formed on the insulating film (2) except the proximal end of the insulating film (2) at which the proximal end (terminal portion (5*a*)) of a pattern wiring (5) is disposed; a protective film (7) for covering the interdigitated electrodes (4) and the pattern electrodes (5); a pair of lead wires (10) which become the external wiring and of which the ends are respectively adhered to the proximal ends (the terminal portions (5*a*)) of the pair of pattern electrodes (5) by a, soldering material (9); and an over-mold resin (11) which covers an interface between the lead wires (10) and the pattern electrodes (5) together with the soldering material (9).

While, in the present embodiment, the interdigitated electrodes (4) are formed on the thin film thermistor portion (3), the interdigitated electrodes (4) may also be formed under a thin film thermistor portion (3).

The insulating film (2) is, for example, a polyimide resin sheet formed, in a band shape having a thickness of from 7.5 to 125 μm. Other examples of the insulating film (2) include polyethylene terephthlate (PET), polyethylene naphthalate (PEN), and the like.

The thin film thermistor portion (3) is formed of a thermistor material, of TiAlN. In particular, the thin film thermistor portion (3) consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal, structure thereof is a hexagonal wurtzite-type single phase.

Each of the pattern, electrodes (5) and the interdigitated electrodes (4) has a bonding layer of Cr or NiCr having a film thickness of from 5 to 100 cm formed on the thin film thermistor portion (3) and an electrode layer of a noble metal such as Au having a film thickness of from 50 to 1000 nm formed on the bonding layer.

The pair of interdigitated electrodes (4) is arranged in opposing relation to each other such that the comb portions (4*a*) are interlocked with one another in an alternating comb-like pattern. A plurality of comb portions (4*a*) on the thin film thermistor portion (3) is connected to the proximal end (4*b*) through an extension part (4*c*).

The distal ends of the pair of pattern electrodes (5) are connected to the corresponding interdigitated electrodes (4) and the proximal ends of the pair of pattern electrodes (5) are the terminal portions (5*a*) arranged at the proximal end of the insulating film (2).

The protective film (7) is an insulating resin film or the like, and a polyimide film having a thickness of 20 μm is employed as the protective film (7).

As described above, the thin film, thermistor portion (3) is a metal nitride material, consisting of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a wurtzite-type (space group $P6_3mc$ (No. 186)) single phase having a hexagonal crystal system. Specifically, the metal nitride material has a composition within the region enclosed by the points A, B, C, and D in the Ti—Al—N-based ternary phase diagram as shown in FIG. 2, wherein the crystal phase thereof is a wurtzite-type metal nitride.

Note that the composition ratios (x, y, z) (at %) at the points A, B, C, and D are A (15, 35, 50), B (2.5, 47.5, 50), C (3, 57, 40), and D (18, 42, 40), respectively.

Also, the thin film thermistor portion (3) is formed into the shape of a film having a film thickness of from 100 to 1000 nm and is a columnar crystal extending in a vertical direction to the surface of the film. Furthermore, it is preferable that the thin film thermistor portion (3) is strongly oriented along the c-axis more than the a-axis in a vertical direction to the surface of the film.

Note that the decision on whether the thin film thermistor portion (3) has a strong a-axis orientation (100) or a strong c-axis orientation (002) in a vertical, direction (film thickness direction) to the surface of the film is determined whether the peak intensity ratio of "the peak intensity of (100)"/"the peak intensity of (002)" is less than 1 by examining the orientation of crystal axis using X-ray diffraction (XRD), where (100) is the Miller index indicating a-axis orientation and (002) is the Miller index indicating c-axis orientation.

A description will be given below of a method for producing the thermistor sensor (1) with reference to FIGS. 3 and 4.

The method for producing the temperature sensor (1) of the present embodiment includes a thin film thermistor portion forming step of forming the thin film thermistor portion (3) on the insulating film (2); an interdigitated electrode forming step of pattern-forming the pair of interdigitated electrodes (4) facing each other on the thin film thermistor portion (3); a pattern electrode forming step of pattern-forming the pair of pattern, electrodes (5) on the insulating film (2); and a protective film forming step of forming the protective film (7) on these surfaces.

As a more specific example of such a production method, a thermistor film of $Ti_xAl_yN_z$ (x=9, y=43, z=48) having a film thickness of 200 nm is deposited on the insulating film (2) made of a polyimide film having a thickness of 40 μm using a Ti—Al alloy sputtering target in the reactive sputtering method in a nitrogen-containing atmosphere. The laminated film is produced under the sputtering conditions of an ultimate degree of vacuum of $5 \times 10^{-6}$ Pa, a sputtering gas pressure of 0.4 Pa, a target input power (output) of 200 W, and a nitrogen gas fraction under a mixed gas (Ar gas+nitrogen gas) atmosphere of 0%.

Furthermore, a, resist solution is coated, on the formed thermistor film using a bar coater, and then prebaking is performed for 1.5 minutes at a temperature of 110° C. After being exposed by an exposure device, an unnecessary portion removed, by a developing solution, and then patterning is performed, by post baking for 5 minutes at a temperature of 150° C. Then, an unnecessary thermistor film of $Ti_xAl_yN_z$ is subject to wet etching using commercially available Ti etchant, and then the resist is stripped so as to form the thin film thermistor portion (3) having the size of 300×400 μm as shown in FIG. 3(a).

Next, a bonding layer of a Cr film having a film thickness of 20 nm, is formed on the thin film thermistor portion (3) and the insulating film (2) in the sputtering method. An electrode layer of an Au film having a film thickness of 200 nm is further formed on the bonding layer in, the sputtering method.

Next, a resist solution is coated on the formed electrode layer using a bar coater, and then prebaking is performed for 1.5 minutes at a temperature of 110° C. After being exposed by an exposure device, an unnecessary portion is removed by a developing solution, and then patterning is performed by post baking for 5 minutes at a temperature of 150° C. Then, an unnecessary electrode portion is subject to wet etching sequentially using commercially available Au etchant, and Cr etchant, and then the resist is stripped so as to form the desired interdigitated electrodes (4) as shown in FIG. 4(b). Note that each of these interdigitated electrodes (4) has six paired comb portions (4a), for example, having a width of 30 μm and an interval of 30 μm.

Furthermore, a conductive resin having a thickness of 10 μm is formed in a predetermined pattern on the insulating film (2) by the printing method and then is cured for 10 minutes at a temperature of 150° C., to thereby form the pair of pattern electrodes (5) as shown in FIG. 3(c). At this time, the distal ends of the pattern electrodes (5) are connected to the proximal ends of the corresponding interdigitated electrodes (4).

Next, a polyimide varnish is coated on the insulating film (2) by the printing method excluding the proximal end of the insulating film (2) including portions to be the terminal portions (5a) and then is cured for 10 minutes at a temperature of 250° C. to thereby form a polyimide protective film (7) having a, thickness of 20 μm as shown in FIG. 4(b).

Furthermore, plated layers (8) formed by thick plating of an electroless Au for solder connection is formed with a thickness of 0.3 μm at portions to be the terminal portions (5a), and the lead wires (10) formed of Dumet wires (0.2 mmφ) are connected to the plated layers (8) by the soldering material (9) as shown in FIG. 4(c) Furthermore, the overmold resin (11) having a thickness of 0.7 mm or greater is coated on the portions to be the terminal portions (5a) and then is cured for 10 minutes at a temperature of 150° C. for fixing the lead wires (10) to thereby produce a film-type thermistor temperature sensor as shown in FIG. 1.

When a plurality of thermistor sensors (1) is simultaneously produced, the thin film thermistor portion (3), the interdigitated electrodes (4), the pattern electrodes (5), and the protective film (7) are formed in plural on a large sized sheet of the insulating film (2) as described above, and then the resulting laminated large film, is cut into a plurality of thermistor sensors (1).

As described above, since, in the temperature sensor (1) of the present embodiment, at least a part of each of the pattern electrodes (5) is formed of a conductive resin, heat flowing from the lead wires (10) serving as the external wiring via the pattern electrodes (5) can be reduced by a, conductive resin having a low thermal conductivity as compared with metals, so that sufficient heat insulation can be expected even if the pattern wiring of the pattern electrodes (5) serving as the extraction electrode portions is not set to be long. In particular, since the insulating film (2) is employed as a substrate, heat, conduction at the substrate side becomes low as compared with other insulating substrates, so that the influence of the wiring becomes relatively large. However, such an influence can be suppressed by the presence of a conductive resin having low heat conduction properties. As described above, the interdigitated electrodes (4) with demand for pattern precision are formed of metals by the photolithography technique or the like, and the pattern electrodes (5) with demand for heat insulation property rather than pattern, precision are formed, of a conductive resin, so that high-precision temperature measurement may be achieved. The use of a conductive resin having higher flexibility as compared with metals leads to an improvement in flexibility of the overall temperature sensor (1).

Since the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), wherein the crystal structure thereof is a wurtzite-type single phase having a hexagonal crystal system, the metal, nitride material having a good B constant and exhibiting excellent heat resistance may be obtained without baking.

Since the metal nitride material is a columnar crystal, extending in a, vertical direction to the surface of the film, the crystallinity of the film is high, resulting in obtaining high heat resistance.

Furthermore, since the metal nitride material is strongly oriented, along the c-axis more than the a-axis in a vertical direction to the surface of the film, the metal nitride material having a high B constant as compared with the case of a strong a-axis orientation is obtained.

Since, in the method for producing the thermistor material layer (the thin film thermistor portion (3)) of the present embodiment, film deposition is performed by reactive sputtering in a nitrogen-containing atmosphere using a Ti—Al alloy sputtering target, the metal nitride material consisting of the above TiAlN can be deposited on a film without baking.

Since a sputtering gas pressure during the reactive sputtering is set to less than 0.67 Pa, the film made of the metal nitride material, which is strongly oriented along the c-axis more than the a-axis in a vertical direction to the surface of the film, can be formed.

Thus, since, in the thermistor sensor (1) of the present embodiment, the thermistor material layer (the thin film thermistor portion (3)) is formed on the insulating film (2), the insulating film (2) having low heat resistance, such as a resin film, can be used by the presence of the thin film thermistor portion (3) which is formed without baking and has a high B constant and high heat resistance, so that a thin and flexible thermistor sensor having an excellent thermistor characteristic is obtained.

Conventionally, a substrate material using a ceramics material such as alumina has often been used. For example, if the substrate material is thinned to a thickness of 0.1 mm, the substrate material is very fragile and easily breakable. In the present invention, a film can be used, so that a very thin film-type thermistor sensor having a thickness of 0.1 mm can be obtained.

Next, a description will be given below of a temperature sensor according to second and third embodiments of the present invention with reference to FIGS. 5 to 9. In the following embodiment, the same components as those described in the above embodiment are denoted by the same reference numerals, and description thereof is omitted.

While the pair of pattern electrodes (5) is linearly formed in the first embodiment, the second embodiment is different from the first embodiment in that, in a temperature sensor (21) according to the second embodiment, each of the pattern electrodes (25) is repeatedly folded back in a meander shape as shown in FIG. 5. Specifically, in the second embodiment, each of the pattern electrodes (25) extends as a whole in the extending direction of the insulating film (2) while being folded in a zigzag pattern, and the distance between the distal end and the proximal, end thereof is shorter than that in the first embodiment. Consequently, the insulating film (2) of the second embodiment is shorter in length than that of the first embodiment.

As described above, since, in the temperature sensor (21) of the second embodiment, each of the pattern electrodes is repeatedly folded back in a meander shape, the entire size of the temperature sensor (21) can be made compact by substantially reducing the distance between the distal end and the proximal end of each of the pattern electrodes (25), and long pattern electrodes (25) can be ensured in a small space, resulting in obtaining a high heat insulation property.

Next, while, in the first embodiment, the thin film thermistor portion (3), the pattern electrodes (5), the interdigitated electrodes (4), and the like are formed on a single insulating film (2), the third embodiment is different from the first embodiment in that, in a temperature sensor (31) according to the third embodiment, an insulating film (32) is comprised, of the divisions of a distal film portion (32A) on which a thin film thermistor portion (33) and the interdigitated electrodes (4) are formed and a proximal film portion (32B) on which a pair of pattern electrodes (35) are formed as shown in FIG. 6.

The third embodiment is also different from the first embodiment in that the interdigitated electrodes (4) and the pattern electrodes (35) are connected to each other by the anisotropic conductive resin (37) and the distal film portion (32A) and the proximal film portion (32B) are connected to each other by the anisotropic conductive resin (37). Specifically, the temperature sensor (31) according to the third embodiment is constituted by a sensor distal end portion (36A) on a distal end side and a sensor proximal end portion (36B) on, a proximal end side, where both portions (36A) and (36B) are joined together end to end. As the anisotropic conductive resin (37), an anisotropic conductive film (ACF) "CP906AM-25AC" made by Sony Chemical. Co. or the like may be employed.

A description will be given of the method for producing the temperature sensor (31) according to the third embodiment with reference to FIGS. 7 and 8.

Firstly, the thin film thermistor portion (33) is formed on the entire surface of the distal film portion (32A) as shown in FIG. 7(a) as in the first embodiment. Furthermore, the interdigitated electrodes (4) are pattern formed on the thin film thermistor portion (33) as shown in FIG. 7(b) as in the first embodiment. Next, a protective film (7A) is formed on the distal end side of the thin, film thermistor portion (33) except the proximal end (4b) of the interdigitated electrodes (4) which are arranged at the end of the distal film portion (32A) so as to cover the interdigitated electrodes (4) as shown in FIG. 7(c). Thus, a sensor distal end portion (36A) is produced.

On the other hand, the pattern electrodes (35) are formed on the proximal film portion (32B) by a conductive resin as shown in FIG. 8 as in the first embodiment to thereby produce a sensor proximal end portion (36B). Furthermore, the proximal end of the produced sensor distal end portion (36A) and the distal end of the produced sensor proximal end portion (36B) are adhered to each other by the anisotropic conductive resin (37). Specifically, the anisotropic conductive resin (37) is coated in the stripe shape on the proximal end of the sensor distal end portion (36A), the sensor distal end portion (36A) is inverted, and then is placed onto the distal end of the sensor proximal end portion (36B) such that the proximal ends (4b) of the interdigitated electrodes (4) and the distal ends of the pattern electrodes (35) are superposed on each other, and the overlapped portion between the proximal ends (4b) of the interdigitated electrodes (4) and, the distal ends of the pattern electrodes (35) is bonded together by pressurization so as to achieve electrical continuity between the interdigitated electrodes (4) and the pattern electrodes (35) to thereby produce the temperature sensor (31). It is preferable that the anisotropic conductive resin (37) includes the same resin material as that in conductive resin used as the pattern electrodes (35).

As described above, since, in the temperature sensor (31) of the third embodiment, the interdigitated electrodes (4) and the pattern electrodes (35) are connected to each other by the anisotropic conductive resin (37) and the distal film portion (32A) and the proximal film portion (32B) are connected to each other by the anisotropic conductive resin (37), the pattern electrodes (35) formed of a conductive resin and the anisotropic conductive resin (37) are connected to each other, resulting in obtaining excellent electrical connection and adhesiveness. The distal film portion (32A) and the proximal film portion (32B), both of which are formed of a resin, are connected to each other by the anisotropic conductive resin (37), resulting in obtaining high adhesiveness. Furthermore, the anisotropic conductive resin (37) having a high heat insulation property is interposed between the distal film portion (32A) and the proximal film portion (32B), so that the influence of heat conducted from the proximal film portion (32B) may be reduced. The insulating film (32) is produced by separately producing the distal film portion (32A) and the proximal film portion (32B), so that a temperature sensor may also be produced with a film portion being replaced with one having a different shape or the like depending on the size or the installation site of the temperature sensor.

EXAMPLES

Next, the evaluation results of Examples produced based on the above embodiment with regard to the thermistor sensor according to the present invention will be specifically described with reference to FIGS. 10 to 18.

<Production of Film Evaluation Element>

Film evaluation elements (121) shown in FIG. 10 were produced as follows as Examples and Comparative Examples for evaluating the thermistor material layer (the thin film thermistor portion (3)) of the present invention.

Firstly, each of the thin film thermistor portions (3) having a thickness of 500 nm, which were made of the metal nitride materials formed with various composition ratios as shown in Table 1, was formed on a Si wafer with a thermal oxidation film as a Si substrate S by using Ti—Al alloy targets formed with various composition ratios in the reactive sputtering method. The thin film thermistor portions (3) were produced under the sputtering conditions of an ultimate degree of vacuum of $5 \times 10^{-6}$ Pa, a sputtering gas pressure of from 0.1 to 1 Pa, a target input power (output) of from 100 to 500 W, and a nitrogen gas fraction under a mixed gas (Ar gas+nitrogen gas) atmosphere of from 10 to 100%.

Next, a Cr film having a thickness of 20 nm was formed and an Au film having a thickness of 100 nm was further formed on the thin film thermistor portions (3) by the sputtering method. Furthermore, a resist solution was coated on the laminated metal films using a spin coater, and then prebaking was performed for 1.5 minutes at a temperature of 110° C. After being exposed by an exposure device, an unnecessary portion was removed by a developing solution, and then pattering was performed by post baking for 5 minutes at a temperature of 150° C. Then, an unnecessary electrode portion was subject to wet etching using commercially available Au etchant and Cr etchant, and then the resist was stripped so as to form a pair of pattern electrodes (124) each having a desired comb shaped electrode portion (124a). Then, the resulting elements were diced into chip elements so as to obtain film evaluation elements (121) to be used for evaluating a. B constant and for testing heat resistance.

Note that Comparative Examples in which the film evaluation elements (121) respectively have the composition ratios of $Ti_xAl_yN_z$ outside the range of the present invention and have different crystal systems were similarly produced for comparative evaluation.

<Film Evaluation>

(1) Composition Analysis

The elemental analysis for the thin film thermistor portion (3) obtained by the reactive sputtering method was performed by X-ray photoelectron spectroscopy (XPS). In the XPS, a quantitative analysis was performed for a sputtering surface up to a depth of 20 nm from the outermost surface by Ar sputtering. The results are shown in Table 1. In the following tables, the composition ratio is represented by "at %".

In the X-ray photoelectron spectroscopy (XPS), a quantitative analysis was performed under the conditions of an X-ray source of MgKα (350 W), a path energy of 58.5 eV, a measurement interval of 0.125 eV, a photo-electron take-off angle with respect to a sample surface of 45 deg and an analysis area of about 800 μmφ. For the quantification precision, the quantification precision of N/(Ti+Al+N) was ±2%, and the quantification precision of Al/(Ti+Al) was ±1%.

(2) Specific Resistance Measurement

The specific resistance of each of the thin film thermistor portions (3) obtained by the reactive sputtering method was measured by the four-probe method at a temperature of 25° C. The results are shown in Table 1.

(3) Measurement of B Constant

The resistance value for each of the film evaluation elements (121) at temperatures of 25° C. and 50° C. was measured in a constant temperature bath, and a B constant was calculated based on the resistance values at temperatures of 25° C. and 50° C. The results are shown in Table 1.

In the B constant calculating method of the present invention, the B constant is calculated by the following formula using the resistance values at temperatures of 25° C. and 50° C.

$$B \text{ constant (K)} = \ln(R25/R50)/(1/T25 - 1/T50)$$

R25 (Ω): resistance value at 25° C.
R50 (Ω): resistance value at 50° C.
T25 (K): 298.15 K which is absolute temperature of 25° C. expressed in Kelvin.
T50 (K): 323.15 K which is absolute temperature of 50° C. expressed in Kelvin As can be seen from these results, a thermistor characteristic having a resistivity of 100 Ω·cm or greater and a B constant of 1500 K or greater is achieved in all Examples in which the composition ratio of $Ti_xAl_yN_z$ falls within the region enclosed by the points A, B, C, and D in the Ti—Al—N-based ternary phase diagram as shown in FIG. 2, i.e., the region where "0.70≤y/(x+y)≤0.95, 0.4≤z≤0.5, and x+y+z=1".

From the above results, a graph illustrating the relationship between a resistivity at 25° C. and a B constant is shown in FIG. 11. Also, a graph illustrating the relationship between the Al/(Ti+Al) ratio and the B constant is shown in FIG. 12. From these graphs, the film evaluation elements (121) which fall within the region where Al/(Ti+Al) is from 0.7 to 0.95 and N/(Ti+Al+N) is from 0.4 to 0.5 and the crystal, system thereof is a hexagonal wurtzite-type single phase have a specific resistance value at a temperature of 25° C. of 100 Ω·cm or greater and a B constant of 1500 K or greater, and thus, fall within the region of high resistance and high. B constant. In data shown in FIG. 12, the reason why the B constant varies with respect to the same Al/(Ti+Al) ratio is because the film evaluation elements (121) have different amounts of nitrogen in their crystals.

Comparative Examples 3 to 12 shown in Table 1 fall within the region where Al/(Ti+Al)<0.7, and the crystal system thereof is a cubic NaCl-type phase. In Comparative Example 12 (Al/(Ti+Al)=0.67), a NaCl-type phase and a wurtzite-type phase coexist. Thus, the region where Al/(Ti+Al)<0.7 exhibits a specific resistance value at a temperature of 25° C. of less than 100 Ω·cm and a B constant of less than 1500 K, and thus, is a region of low resistance and low B constant.

Comparative Examples 1 and 2 shown in Table 1 fall within the region where N/(Ti+Al+N) is less than 40%, and thus, are in a crystal state where nitridation of metals contained therein is insufficient. Comparative Examples 1 and 2 were neither a NaCl-type nor a wurtzite-type and had very poor crystallinity. In addition, it was found that Comparative Examples 1 and 2 exhibited near-metallic behavior because both the B constant and the resistance value were very small.

(4) Thin Film X-Ray Diffraction (Identification of Crystal Phase)

The crystal phases of the thin film thermistor portions (3) obtained by the reactive sputtering method were identified by Grazing Incidence X-ray Diffraction. The thin film X-ray diffraction is a small angle X-ray diffraction experiment. Measurement was performed under the condition of a Cu X-ray tube, the angle of incidence of 1 degree, and 2θ of from 20 to 130 degrees.

As a result of measurement, a wurtzite-type phase (hexagonal, the same phase as that of AlN) was obtained in the region where Al/(Ti+Al)≥0.7, whereas a NaCl-type phase (cubic, the same phase as that of TiN) was obtained in the region where Al/(Ti+Al)<0.65. A crystal phase in which a wurtzite-type phase and a NaCl-type phase coexist was obtained in the region where 0.65<Al/(Ti+Al)<0.7.

Thus, in the Ti—Al—N-based metal nitride material, the region of high resistance and high B constant exists in the wurtzite-type phase where Al/(Ti+Al)≥0.7. In Examples of the present invention, no impurity phase was confirmed and the crystal structure thereof was a wurtzite-type single phase.

In Comparative Examples 1 and 2 shown in Table 1, the crystal, phase thereof was neither a wurtzite-type phase nor a NaCl-type phase as described above, and thus, could not be identified in the testing. In these Comparative Examples, the peak width of XRD was very large, resulting in obtaining materials exhibiting very poor crystallinity. It is contemplated that the crystal phase thereof was a metal phase with insufficient nitridation because Comparative Examples 1 and 2 exhibited near-metallic behavior from the viewpoint of electric characteristics.

TABLE 1

| | CRYSTAL SYSTEM | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OF c-AXIS) | SPUTTERING GAS PRESSURE (Pa) |
|---|---|---|---|---|
| COMPARATIVE EXAMPLE 1 | UNKNOWN (INSUFFICIENT NITRIDATION) | — | | — |
| COMPARATIVE EXAMPLE 2 | UNKNOWN (INSUFFICIENT NITRIDATION) | — | | — |
| COMPARATIVE EXAMPLE 3 | NaCl TYPE | — | | — |
| COMPARATIVE EXAMPLE 4 | NaCl TYPE | — | | — |
| COMPARATIVE EXAMPLE 5 | NaCl TYPE | — | | — |
| COMPARATIVE EXAMPLE 6 | NaCl TYPE | — | | — |
| COMPARATIVE EXAMPLE 7 | NaCl TYPE | — | | — |
| COMPARATIVE EXAMPLE 8 | NaCl TYPE | — | | — |
| COMPARATIVE EXAMPLE 9 | NaCl TYPE | — | | — |
| COMPARATIVE EXAMPLE 10 | NaCl TYPE | — | | — |
| COMPARATIVE EXAMPLE 11 | NaCl TYPE | — | | — |
| COMPARATIVE EXAMPLE 12 | UNKNOWN (INSUFFICIENT NITRIDATION) | — | | — |
| EXAMPLE 1 | WURTZITE TYPE | 0.05 | c-AXIS | <0.67 |
| EXAMPLE 2 | WURTZITE TYPE | 0.07 | c-AXIS | <0.67 |
| EXAMPLE 3 | WURTZITE TYPE | 0.45 | c-AXIS | <0.67 |
| EXAMPLE 4 | WURTZITE TYPE | <0.01 | c-AXIS | <0.67 |
| EXAMPLE 5 | WURTZITE TYPE | 0.34 | c-AXIS | <0.67 |
| EXAMPLE 6 | WURTZITE TYPE | <0.01 | c-AXIS | <0.67 |
| EXAMPLE 7 | WURTZITE TYPE | 0.09 | c-AXIS | <0.67 |
| EXAMPLE 8 | WURTZITE TYPE | 0.05 | c-AXIS | <0.67 |
| EXAMPLE 9 | WURTZITE TYPE | <0.01 | c-AXIS | <0.67 |
| EXAMPLE 10 | WURTZITE TYPE | 0.04 | c-AXIS | <0.67 |
| EXAMPLE 11 | WURTZITE TYPE | 0.24 | c-AXIS | <0.67 |
| EXAMPLE 12 | WURTZITE TYPE | 0.73 | c-AXIS | <0.67 |
| EXAMPLE 13 | WURTZITE TYPE | <0.01 | c-AXIS | <0.67 |
| EXAMPLE 14 | WURTZITE TYPE | 0.38 | c-AXIS | <0.67 |
| EXAMPLE 15 | WURTZITE TYPE | 0.13 | c-AXIS | <0.67 |
| EXAMPLE 16 | WURTZITE TYPE | 3.54 | a-AXIS | ≥0.67 |
| EXAMPLE 17 | WURTZITE TYPE | 2.94 | a-AXIS | ≥0.67 |
| EXAMPLE 18 | WURTZITE TYPE | 1.05 | a-AXIS | ≥0.67 |
| EXAMPLE 19 | WURTZITE TYPE | 2.50 | a-AXIS | ≥0.67 |
| EXAMPLE 20 | WURTZITE TYPE | 9.09 | a-AXIS | ≥0.67 |
| EXAMPLE 21 | WURTZITE TYPE | 6.87 | a-AXIS | ≥0.67 |
| EXAMPLE 22 | WURTZITE TYPE | 2.22 | a-AXIS | ≥0.67 |
| EXAMPLE 23 | WURTZITE TYPE | 1.21 | a-AXIS | ≥0.67 |
| EXAMPLE 24 | WURTZITE TYPE | 3.33 | a-AXIS | ≥0.67 |

TABLE 1-continued

| | | COMPOSITION RATIO | | | RESULT OF ELECTRIC PROPERTIES | |
|---|---|---|---|---|---|---|
| | Ti (%) | Al (%) | N (%) | Al/(Ti + Al) (%) | B CONSTANT (K) | SPECIFIC RESISTANCE VALUE AT 25° C. (Ω cm) |
| COMPARATIVE EXAMPLE 1 | 29 | 43 | 28 | 60 | <0 | 2.E−04 |
| COMPARATIVE EXAMPLE 2 | 16 | 54 | 30 | 77 | 25 | 4.E−04 |
| COMPARATIVE EXAMPLE 3 | 50 | 0 | 50 | 0 | <0 | 2.E−05 |
| COMPARATIVE EXAMPLE 4 | 47 | 1 | 52 | 3 | 30 | 2.E−04 |
| COMPARATIVE EXAMPLE 5 | 51 | 3 | 46 | 6 | 248 | 1.E−03 |
| COMPARATIVE EXAMPLE 6 | 50 | 5 | 45 | 9 | 69 | 1.E−03 |
| COMPARATIVE EXAMPLE 7 | 23 | 30 | 47 | 57 | 622 | 3.E−01 |
| COMPARATIVE EXAMPLE 8 | 22 | 33 | 45 | 60 | 477 | 2.E−01 |
| COMPARATIVE EXAMPLE 9 | 21 | 32 | 47 | 61 | 724 | 4.E+00 |
| COMPARATIVE EXAMPLE 10 | 20 | 34 | 46 | 63 | 584 | 5.E−01 |
| COMPARATIVE EXAMPLE 11 | 19 | 35 | 46 | 65 | 402 | 5.E−02 |
| COMPARATIVE EXAMPLE 12 | 18 | 37 | 45 | 67 | 665 | 2.E+00 |
| EXAMPLE 1 | 15 | 38 | 47 | 72 | 1980 | 4.E+02 |
| EXAMPLE 2 | 12 | 38 | 50 | 76 | 2798 | 5.E+04 |
| EXAMPLE 3 | 11 | 42 | 47 | 79 | 3385 | 1.E+05 |
| EXAMPLE 4 | 11 | 41 | 48 | 79 | 2437 | 4.E+02 |
| EXAMPLE 5 | 9 | 43 | 48 | 83 | 2727 | 2.E+04 |
| EXAMPLE 6 | 8 | 42 | 50 | 84 | 3057 | 2.E+05 |
| EXAMPLE 7 | 8 | 44 | 48 | 84 | 2665 | 3.E+03 |
| EXAMPLE 8 | 8 | 44 | 48 | 85 | 2527 | 1.E+03 |
| EXAMPLE 9 | 8 | 45 | 47 | 86 | 2557 | 8.E+02 |
| EXAMPLE 10 | 7 | 46 | 46 | 86 | 2449 | 1.E+03 |
| EXAMPLE 11 | 7 | 48 | 45 | 88 | 3729 | 4.E+05 |
| EXAMPLE 12 | 5 | 49 | 46 | 90 | 2798 | 5.E+05 |
| EXAMPLE 13 | 5 | 45 | 50 | 90 | 4449 | 3.E+06 |
| EXAMPLE 14 | 5 | 50 | 45 | 91 | 1621 | 1.E+02 |
| EXAMPLE 15 | 4 | 50 | 46 | 93 | 3439 | 6.E+05 |
| EXAMPLE 16 | 15 | 43 | 42 | 74 | 1507 | 3.E+02 |
| EXAMPLE 17 | 10 | 49 | 41 | 83 | 1794 | 3.E+02 |
| EXAMPLE 18 | 6 | 52 | 42 | 90 | 2164 | 1.E+02 |
| EXAMPLE 19 | 9 | 44 | 47 | 83 | 2571 | 5.E+03 |
| EXAMPLE 20 | 8 | 46 | 46 | 84 | 2501 | 6.E+03 |
| EXAMPLE 21 | 8 | 45 | 47 | 84 | 2408 | 7.E+03 |
| EXAMPLE 22 | 8 | 46 | 46 | 86 | 2364 | 3.E+04 |
| EXAMPLE 23 | 7 | 46 | 47 | 87 | 3317 | 2.E+06 |
| EXAMPLE 24 | 6 | 51 | 43 | 89 | 2599 | 7.E+04 |

Next, all of Examples in the present invention were wurtzite-type phase films having strong orientation. Thus, whether the films have strong a-axis orientation or c-axis orientation to the crystal axis in a vertical direction (film thickness direction) to the Si substrate S was examined by XRD. At this time, in order to examine the orientation of crystal axis, the peak intensity ratio of (100)/(002) was measured, where (100) is the Miller index indicating a-axis orientation and (002) is the Miller index indicating c-axis orientation.

Consequently, in Examples in which film deposition was performed at a sputtering gas pressure of less than 0.67 Pa, the intensity of (002) was much stronger than that of (100), so that the films exhibited stronger c-axis orientation than a-axis orientation. On the other hand, in Examples in which film deposition was performed at a sputtering gas pressure of 0.67 Pa or greater, the intensity of (100) was much stronger than that of (002), so that the films exhibited stronger a-axis orientation than c-axis orientation.

Note that it was confirmed that a wurtzite-type single phase was formed in the same manner even when the thin, film thermistor portion (3) was deposited on a polyimide film under the same deposition condition. In addition, it was confirmed that the crystal orientation did not change even when the thin film thermistor portion (3) was deposited on a polyimide film under the same deposition condition.

An exemplary XRD profile in Example exhibiting strong c-axis orientation is shown in FIG. 13. In this Example, Al/(Ti+Al) was equal to 0.84 (wurtzite-type, hexagonal), and measurement was performed at the angle of incidence of 1 degree. As can be seen from the result in this Example, the intensity of (002) was much stronger than that of (100).

An exemplary XRD profile in Example exhibiting strong a-axis orientation is shown in FIG. 14. In this Example, Al/(Ti+Al) was equal to 0.83 (wurtzite-type, hexagonal), measurement was performed at the angle of incidence of 1 degree. As can be seen from the result in this Example, the intensity of (100) was much stronger than that of (002).

Furthermore, in this Example, symmetrical reflective measurement was performed at the angle of incidence of 0 degrees. The asterisk (*) in the graph was a peak derived from the device, and thus, it was confirmed that the asterisk (*) in the graph is neither a peak derived from the sample itself nor a peak derived from the impurity phase (it can be seen from the fact that the peak indicated by (*) is lost in the symmetrical reflective measurement, and thus, it is a peak derived from the device).

An exemplary XRD profile in Comparative Example is shown in FIG. 15. In this Comparative Example, Al/(Ti+Al) was equal to 0.6 (NaCl type, cubic) and measurement was performed at the angle of incidence of 1 degree. No peak which could be indexed as a wurtzite-type (space group $P6_3mc$ (No. 186)) was detected, and thus, this Comparative Example was confirmed as a NaCl-type single phase.

Next, the correlation between a crystal structure and its electric characteristic was compared in detail with each other with regard to Examples of the present invention in which the wurtzite-type materials were employed.

As shown in Table 2 and FIG. 16, there were materials (Examples 5, 7, 8, and 9) of which the crystal axis is strongly oriented along a c-axis in a vertical direction to the surface of the substrate and materials (Examples 19, 20, and 21) of which the crystal axis is strongly oriented along an a-axis in a vertical direction to the surface of the substrate despite the fact that they have substantially the same Al/(Ti+Al) ratio.

When both groups were compared to each other, it was found that the materials having a strong c-axis orientation had a greater B constant by about 100 K than that of the materials having a strong a-axis orientation upon the same Al/(Ti+Al) ratio. When focus was placed on the amount of N (N/(Ti+Ai+N)), it was found that the materials having a strong c-axis orientation had a slightly larger amount of nitrogen than that of the materials having a strong a-axis orientation. Since the ideal stoichiometric ratio of N/(Ti+Al+N) is 0.5, it was found that the materials having a strong c-axis orientation were ideal materials due to a small amount of nitrogen defects.

TABLE 2

| | CRYSTAL SYSTEM | XRD PEAK INTENSITY RATIO OF (100)/(002) WHEN CRYSTAL PHASE IS WURTZITE TYPE PHASE | CRYSTAL AXIS EXHIBITING STRONG DEGREE OF ORIENTATION IN VERTICAL DIRECTION TO SUBSTRATE SURFACE WHEN CRYSTAL PHASE IS WURTZITE TYPE PHASE (a-AXIS OF c-AXIS) | SPUTTERING GAS PRESSURE (Pa) |
|---|---|---|---|---|
| EXAMPLE 6 | WURTZITE TYPE | 0.34 | c-AXIS | <0.67 |
| EXAMPLE 7 | WURTZITE TYPE | 0.09 | c-AXIS | <0.67 |
| EXAMPLE 8 | WURTZITE TYPE | 0.05 | c-AXIS | <0.67 |
| EXAMPLE 9 | WURTZITE TYPE | <0.01 | c-AXIS | <0.67 |
| EXAMPLE 19 | WURTZITE TYPE | 2.50 | a-AXIS | ≥0.67 |
| EXAMPLE 20 | WURTZITE TYPE | 9.09 | a-AXIS | ≥0.67 |
| EXAMPLE 21 | WURTZITE TYPE | 6.67 | a-AXIS | ≥0.67 |

| | COMPOSITION RATIO | | | | RESULT OF ELECTRIC PROPERTIES | |
|---|---|---|---|---|---|---|
| | Ti (%) | Al (%) | N (%) | Al/(Ti + Al) (%) | B CONSTANT (K) | SPECIFIC RESISTANCE VALUE AT 25° C. (Ω cm) |
| EXAMPLE 6 | 9 | 43 | 48 | 83 | 2727 | 2.E+04 |
| EXAMPLE 7 | 8 | 44 | 48 | 84 | 2665 | 3.E+03 |
| EXAMPLE 8 | 8 | 44 | 48 | 85 | 2527 | 1.E+03 |
| EXAMPLE 9 | 8 | 45 | 47 | 86 | 2557 | 8.E+02 |
| EXAMPLE 19 | 9 | 44 | 47 | 83 | 2571 | 5.E+03 |
| EXAMPLE 20 | 8 | 46 | 46 | 84 | 2501 | 6.E+03 |
| EXAMPLE 21 | 8 | 45 | 47 | 84 | 2408 | 7.E+03 |

<Crystal Form Evaluation>

Next, as an exemplary crystal form in the cross-section of the thin film thermistor portion (3), a cross-sectional SEM photograph of the thin film thermistor portion (3) in Example (Al/(Ti+Al)=0.84, wurtzite-type, hexagonal, and strong c-axis orientation) in which the thin film, thermistor portion (3) was deposited on the Si substrate S with a thermal oxidation film is shown in FIG. 17. Also, a cross-sectional SEM photograph of the thin-film thermistor portion (3) in another Example (Al/(Ti+Al)=0.83, wurtzite-type, hexagonal, and strong a-axis orientation) is shown in FIG. 18.

The samples in these Examples were obtained by breaking the Si substrates S by cleaving them. The photographs were taken by tilt observation at the angle of 45 degrees.

As can be seen from these photographs, samples were formed of a high-density columnar crystal in both Examples. Specifically, the growth of columnar crystal in a direction perpendicular to the surface of the substrate was observed in Example revealing a strong c-axis orientation and another Example revealing a strong a-axis orientation. Note that the break of the columnar crystal was generated upon breaking the Si substrate S by cleaving it.

<Film Heat Resistance Test Evaluation>

In Examples and Comparative Example shown in Table 1, a resistance value and a B constant before and after the heat resistance test at a temperature of 125° C. for 1000 hours in air were evaluated. The results are shown in Table 3. Comparative Example made by a conventional Ta—Al—N-based material was also evaluated in the same manner for comparison.

As can be seen from these results, although the Al concentration and the nitrogen concentration vary, the heat resistance of the Ti—Al—N-based material based on the electric characteristic change before and after the heat resistance test is better than the Ta—Al—N-based material in Comparative Example when comparison is made by using the same B constant. Note that the materials used in Examples 5 and 8 have a strong c-axis orientation and the materials used in Examples 21 and 24 have a strong a-axis orientation. When both groups were compared to each other, the heat resistance of Examples revealing a strong c-axis orientation is slightly improved as compared with that of Examples revealing a strong a-axis orientation.

Note that, in the Ta—Al—N-based material, ionic radius of Ta is very high compared to that of Ti and Al, and thus, a wurtzite-type phase cannot be produced in the high-concentration Al region. It is contemplated that the Ti—Al—N-based material having the wurtzite-type phase has better heat resistance than the Ta—Al—N-based material because the Ta—Al—N-based material is not the wurtzite-type phase.

TABLE 3

| | M ELEMENT | M (%) | Al (%) | N (%) | Al/(M + Al) (%) | B25-50 (K) | SPECIFIC RESISTANCE VALUE AT 25° C. ($\Omega$ cm) | RISING RATE OF SPECIFIC RESISTANCE AT 25° C. AFTER HEAT RESISTANCE TEST AT 125° C. FOR 1,000 HOURS (%) | RISING RATE OF CONSTANT B AFTER HEAT RESISTANCE TEST AT 125° C. FOR 1,000 HOURS (%) |
|---|---|---|---|---|---|---|---|---|---|
| COMPARATIVE EXAMPLE | Ta | 60 | 1 | 39 | 2 | 2671 | 5.E+02 | 25 | 16 |
| EXAMPLE 5 | Ti | 9 | 43 | 48 | 83 | 2727 | 2.E+04 | <4 | <1 |
| EXAMPLE 8 | Ti | 8 | 44 | 48 | 85 | 2527 | 1.E+03 | <4 | <1 |
| EXAMPLE 21 | Ti | 8 | 45 | 47 | 84 | 2408 | 7.E+03 | <5 | <1 |
| EXAMPLE 24 | Ti | 6 | 51 | 43 | 89 | 2599 | 7.E+04 | <5 | <1 |

The technical scope of the present invention is not limited to the aforementioned embodiments and Examples, but the present invention may be modified in various ways without departing from the scope or teaching of the present invention.

REFERENCE NUMERALS 1, 21, and 31: temperature sensor, 2 and 32: insulating film, 3 and 33: thin film thermistor portion, 4: interdigitated electrode, 4a: comb portion, 5, 25, and 35: pattern electrode, 7 and 7A: protective film, 32A: distal film portion, 32B: proximal film portion, 37: anisotropic conductive resin

What is claimed is:

1. A temperature sensor comprising:
   an insulating film;
   a thin film thermistor portion which is formed on the surface of the insulating film with a thermistor material of TiAlN;
   a pair of interdigitated electrodes which have a plurality of comb portions and are pattern-formed on at least one of the top or the bottom of the thin film thermistor portion using a metal so as to face each other; and
   a pair of pattern electrodes which are pattern-formed on the surface of the insulating film and are connected to the pair of interdigitated electrodes,
   wherein at least a part of each of the pattern electrodes is formed of a conductive resin,
   wherein the insulating film is comprised of the divisions of a distal film portion on which the thin film thermistor portion and the interdigitated electrodes are formed and a proximal film portion on which the pattern electrodes are formed, and,
   wherein the interdigitated electrodes and the pattern electrodes that is formed of a conductive resin are connected to each other by a conductive resin and the distal film portion and the proximal film portion are connected to each other by a conductive resin.

2. The temperature sensor according to claim 1, wherein each of the pattern electrodes is repeatedly folded back in a meander shape.

3. The temperature sensor according to claim 1, wherein the thin film thermistor portion consists of a metal nitride represented by the general formula: $Ti_xAl_yN_z$ (where $0.70 \leq y/(x+y) \leq 0.95$, $0.4 \leq z \leq 0.5$, and $x+y+z=1$), and the crystal structure thereof is a hexagonal wurtzite-type single phase.

* * * * *